United States Patent
Lim et al.

(10) Patent No.: US 7,030,574 B2
(45) Date of Patent: Apr. 18, 2006

(54) LUMINARY CONTROL SYSTEM

(76) Inventors: Kevin Len Li Lim, 34000 Taiping, Perak (MY); Joon Chok Lee, 93150 Kuching, Sarawak (MY); Rizal Bin Jaffar, 78300 Maslid, Melaka (MY)

( * ) Notice: Subject to any disclaimer, the term of this patent is extended or adjusted under 35 U.S.C. 154(b) by 0 days.

(21) Appl. No.: 11/106,910

(22) Filed: Apr. 14, 2005

(65) Prior Publication Data

US 2005/0174068 A1     Aug. 11, 2005

Related U.S. Application Data

(63) Continuation of application No. 10/740,947, filed on Dec. 18, 2003, now Pat. No. 6,894,442.

(51) Int. Cl.
*H05B 37/00*     (2006.01)

(52) U.S. Cl. .................... 315/312; 315/291; 315/158

(58) Field of Classification Search .............. 315/158, 315/149, 291, 307, 312, 324, 247, 246
See application file for complete search history.

(56) References Cited

U.S. PATENT DOCUMENTS

| | | | |
|---|---|---|---|
| 4,390,280 A | 6/1983 | Celio et al. ............... 356/445 |
| 5,336,976 A * | 8/1994 | Webb et al. ............... 315/134 |
| 2003/0222600 A1* | 12/2003 | Tateishi et al. ............ 315/291 |
| 2005/0134197 A1* | 6/2005 | Lee et al. .................. 315/291 |

* cited by examiner

*Primary Examiner*—Tuyet Thi Vo

(57) ABSTRACT

A light source and method for controlling the same. The light source utilizes a light generator that generates a light signal of a wavelength at an intensity that is set by a control signal. The control signal is controlled by a servo that monitors the light output of the light generator and compares the monitored value with a target value. When the target value is changed, the control signal is initially replaced by a predicted control signal based on the new target value rather than the error signal generated in the servo. This provides time for the servo to adjust to the new target value. In one embodiment, the control signal includes a periodic signal that switches between a value that causes the light generator to generate light of the wavelength and a second value at which the light generator does not generate light of the wavelength.

3 Claims, 4 Drawing Sheets

LUMINARY CONTROL SYSTEM

CROSS-REFERENCE TO RELATED APPLICATION

This application is a continuation Ser. No. of 10/740,947 filed Dec. 18, 2003, now U.S. Pat. No. 6,894,442.

FIELD OF THE INVENTION

The present invention relates to light sources.

BACKGROUND OF THE INVENTION

Light emitting diodes (LEDs) are attractive candidates for replacing conventional light sources such as incandescent lamps and fluorescent light sources. The LEDs have higher light conversion efficiencies and longer lifetimes. Unfortunately, LEDs produce light in a relatively narrow spectral band. Hence, to produce a light source having an arbitrary color, a compound light source having multiple LEDs is typically utilized. For example, an LED-based light source that provides an emission that is perceived as matching a particular color can be constructed by combining light from red, green, and blue emitting LEDs. The ratio of the intensities of the various colors sets the color of the light as perceived by a human observer.

One method of varying LED intensity is to vary the amount of time the LED is turned on. In such schemes, the LED is pulsed on a time scale that is too fast to be seen by a human observer. During each cycle, the LED is on for some fraction of the cycle time. Since the observer's eye integrates the light received over a time period that is long compared to the cycle time, the observer "sees" a light source whose intensity is proportional to the duty factor, i.e., the ratio of the time the LED is turned on to the time the LED is turned off. The intensity is a linear function of the duty factor, and hence, the control system is relatively simple. Alternatively, the intensity of the LED can be varied by varying the magnitude of current through the LEDs.

To provide very accurate color reproduction, LED light sources often use a sensor and feedback system. A light source is constructed from a combination of three LEDs that emit red, green, and blue light and three photodetectors that observe the light generated by the LED and adjust the duty factors of each LED to provide the precise color desired. The feedback circuit must generate measurements of the average light being generated at each color from the pulsing light signal that is produced by each LED. This average light signal is typically generated by utilizing a low-pass filter to filter the output of each photodetector. The low-pass filter introduces a delay in the feedback system that is sufficient to cause the feedback system to become unstable when the light source is switched between different colors in which one or more of the duty factors change by a large amount. While such instabilities can be reduced by utilizing complex active filters, this solution increases the cost and complexity of the light source.

SUMMARY OF THE INVENTION

The present invention includes a light source and method for controlling the same. The light source utilizes a light generator that generates a first light signal of a first wavelength at a first intensity that is set by a first control signal. A light monitor generates a first monitor signal having an amplitude determined by the first intensity. A target signal generator generates a first target signal having an amplitude indicative of a first target value. A difference circuit generates a first error signal having a magnitude related to the difference of the amplitudes of the first monitor signal and the first target signal. A feedback controller generates the first control signal in response to the first error signal. An initial control signal generator that causes the feedback controller to generate a preliminary first control signal in place of the first control signal, the preliminary control signal is independent of the first error signal and is generated for a first time period after the first target value changes to a new first target value. In one embodiment, the preliminary first control signal depends on the new first target value. In another embodiment, the first control signal includes a periodic signal that switches between a first value that causes the light generator to generate light of the first wavelength and a second value at which the light generator does not generate light of the first wavelength. The feedback controller varies the fraction of time at which the first control signal is at the first value. In another embodiment, the light monitor includes a photodetector and a low pass filter characterized by a delay time, and the first time period is set to a value greater than the delay time. Embodiments that include multiple light generators that generate light in different spectral bands can also be constructed to provide a color light source having an output color that can be controlled and rapidly changed.

DETAILED DESCRIPTION OF THE PREFERRED EMBODIMENTS OF THE INVENTION

Figure 1:
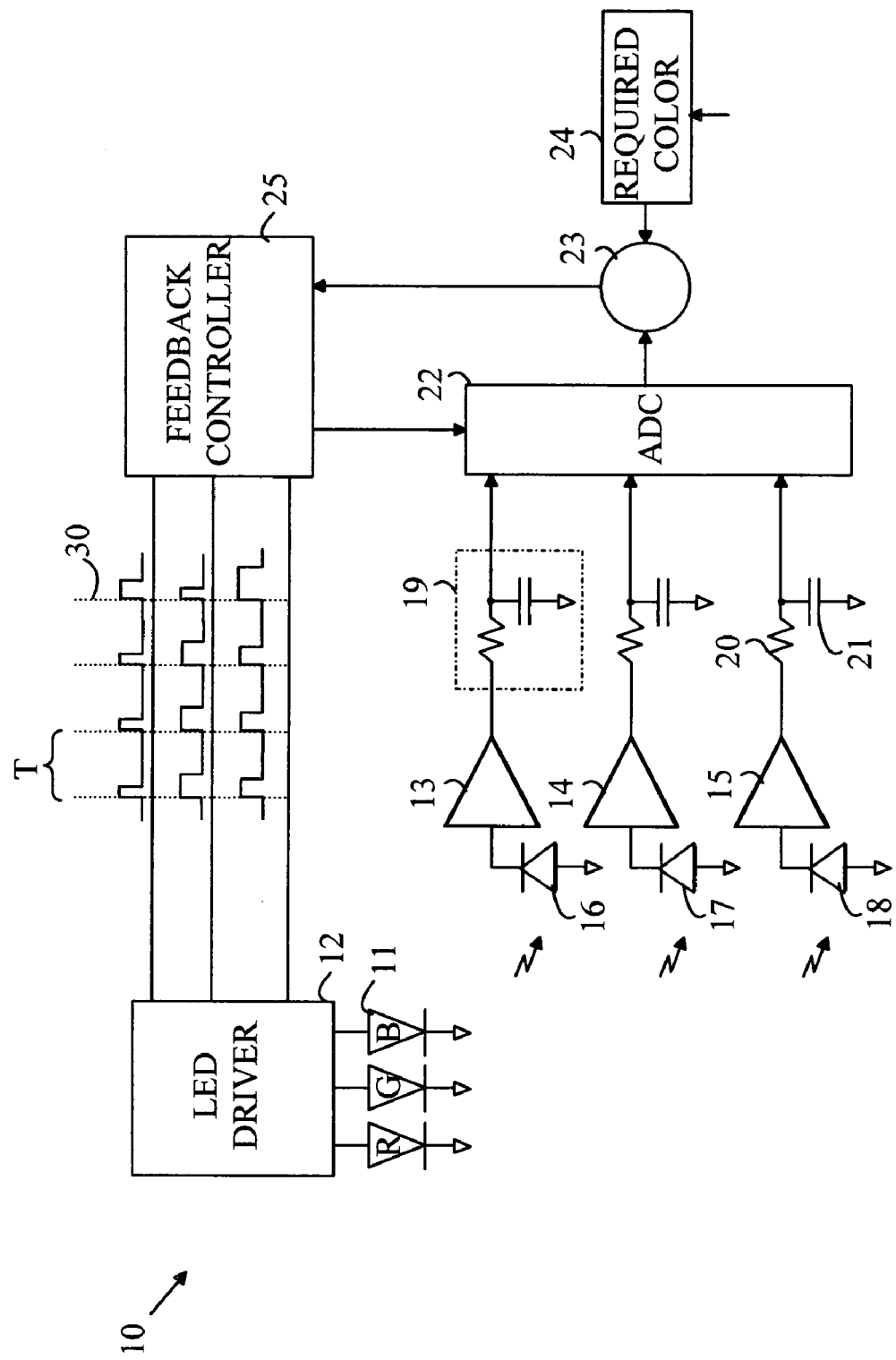
FIG. 1 is a block diagram of a prior art LED light source that utilizes a feedback system to control the duty factor of the individual LEDs to produce a precise output color.

The manner in which the present invention provides its advantages can be more easily understood with reference to FIG. 1. FIG. 1 is a block diagram of a prior art LED light source that utilizes a feedback system to control the duty factor of the individual LEDs to produce a precise output color. Light source 10 utilizes red, green, and blue LEDs 11 to generate light of an arbitrary color. The LEDs are driven by a driver 12 that sets the current through each LED when that LED is "on". In the "on" state, each LED is driven with a predetermined current that is independent of the color being generated by light source 10. The LEDs are driven in a pulsed manner with a cycle time having a period T. During each period, each of the LEDs is turned on for a time t that depends on the color of light that is to be generated by light source 10.

To simplify the following discussion the ratio t/T will be referred to as the duty factor. In principle, the intensity of the light, as seen by a human observer, from each of the LEDs is proportional to t for that LED, provided the period T is sufficiently small. Unfortunately, the LEDs do not turn on and off instantaneously and the light output from any LED may also be a function of the duty factor, since the operating temperature of the LED will increase with increasing duty factors. However, there is a fixed relationship between the desired output color and the duty factors applied to the three LEDs. The relationship is determined continuously by measuring the light that is actually generated and adjusting the duty factors using a servo loop.

Referring again to FIG. 1, light source 10 includes three photodetectors 16–18 that receive a portion of the light leaving the LEDs. Ideally, each photodetector is configured to respond in the same manner as the CIE color matching functions, $X(\lambda)$, $Y(\lambda)$ and $Z(\lambda)$ respectively. The output of ideal photodetectors will produce measurements that correspond to the CIE standard color scheme. Alternative standard color schemes can be used. In practice, photodetectors that do not correspond to standard color schemes can be utilized as long as there is a specific relationship between light produced by light source 10 and photodetector output.

Each photodetector has a corresponding interface circuit that matches the signal from the corresponding photodetector to a low pass filter. The interface circuits corresponding to photodetectors 16–18 are shown at 13–15, respectively. An exemplary low pass filter is shown at 19. Each low pass filter consists of a resistor 20 and a capacitor 21. The resistor and capacitor values are chosen to average out the on and off cycles such that the outputs of the low pass filters are DC levels representing the intensity of light in each of the three wavelength bands. The outputs of the low pass filters are digitized using ADC 22 and compared to target values that are stored in a register stack 24 in a subtraction circuit 23 that generates a signal related to the difference of the output of the low pass filter and the target value. The target values represent the three intensities corresponding to the desired output color. The differences between the measured intensities and target intensities provide three error signals that are used by feedback controller 25 to adjust the three corresponding duty factors until the measured output matches the target values.

When the output color is changed by providing new target values to register stack 24, the feedback loop, in principle, operates to adjust the duty factors to new values that will provide the new color. Such an ideal color change is shown at 30. Unfortunately, the low pass filters have a significant time delay. When a new set of color values is introduced into register stack 24, the error signal increases immediately, since the DC values generated by the low pass filters that matched the old values will now differ from the new values. The feedback controller immediately alters the duty cycles. However, the changes in the duty cycles do not immediately change the outputs of the low pass filters. Hence, even if the feedback controller exactly guessed the correct duty cycles, the error signals will remain non-zero for a period of time determined by the RC time constants of the low pass filters. Since the low pass filters must smooth out the pulses in the drive signals to generate DC values, these time constants are long compared to T. Hence, several time periods of T must elapse before the results of the first adjustment are seen at the output of the low pass filters. During this transition period, the feedback controller will continue to make changes in the duty cycles based on the now erroneous error signals. As a result, the feedback loop can become unstable.

These instabilities can be avoided by updating the duty cycle at more infrequent intervals or by using more complex active filter designs which increase the cost and complexity of the feedback system. In general, the feedback controller samples the error signals on some periodic basis. If the time between samples is much longer than the RC time constant of the low pass filter, the feedback system will be stable. However, the time needed to settle to the correct new duty cycles will be excessive if the differences between the old duty cycles and the correct new duty cycles are excessively large. Such long settling times are unacceptable in many applications.

The present invention avoids these problems by using a two-phase system for changing the duty cycles when a new color value is introduced. In the first phase, close approximations to the final duty factors are used to immediately change the duty cycles. The feedback loop is disabled during this phase. Hence, the outputs of the LEDs change immediately to outputs that are reasonable approximations of the final duty cycles. After the low pass filters have had time to settle, the system enters the second phase in which the feedback loop is enabled and takes over the adjustment of the duty cycles to provide the final output color. Since the approximate values introduced in the first phase are close to the final values, the error signals at this beginning of the second phase will be small. Accordingly, the time needed to settle on the final values is reduced even in the case in which the update cycle time is much longer than the RC time constant of the low pass filter.

Figure 2:
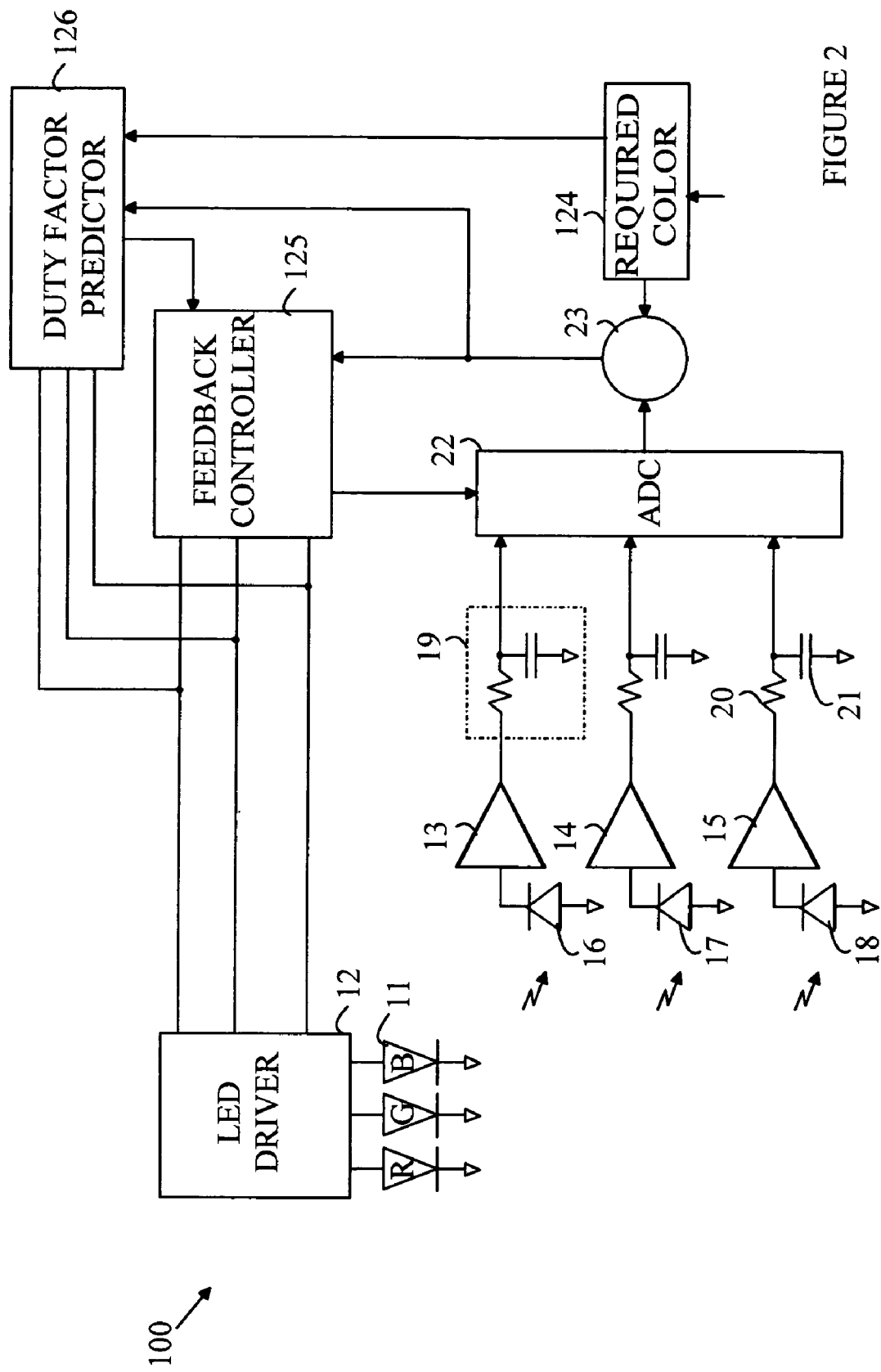
FIG. 2 is a block diagram of a light source according to one embodiment of the present invention.

Refer now to FIG. 2, which is a block diagram of a light source 100 according to one embodiment of the present invention. To simplify the following discussion, those elements of light source 100 that serve the same functions as elements discussed above with reference to FIG. 1 have been assigned the same reference numerals and will not be discussed further here. Light source 100 includes a duty factor predictor 126 that is activated when a new color setting is entered into color register 124. Duty factor predictor 126 inhibits feedback controller 125 when it is activated. Duty factor predictor 126 then provides the pulse trains to LED driver 12 based on the new color values. After a sufficient period of time has elapsed, Duty factor predictor 126 releases feedback controller 125, which takes over generating of the pulse trains and sets the duty factors using the conventional feedback strategy.

As noted above, the duty factor for each color LED is proportional to the light intensity that is to be generated by that LED. Denote the color that is input to color register 124 by the color triplet (R,G,B), where R is the intensity of light in the red region, G is the intensity of light in the green region, and B is the intensity of light in the blue region. Denote the corresponding duty factor estimates by $(D_r, D_g, D_b)$. The duty factor estimate that is to be utilized with any particular color value can be obtained from experimental data gathered prior to deployment of the light source in an application. Typically, this data is obtained during the photodetector calibration procedure. Such a procedure involves taking measurements of the light source using a spectrometer that outputs three values in a standardized color scheme for each of the following three conditions, $(D_r, D_g, D_b)=(1,0,0)$, $(D_r, D_g, D_b)=(0,1,0)$ and $(D_r, D_g, D_b)=(0,0,1)$ where 1 corresponds to the LED being "on" for entire duration of period T, and 0 corresponds to the LED being "off" for the entire duration of period T. Denote the spectrometer output by the triplet (X, Y, Z). Each of the three measurement conditions yields yields a spectrometer output triplet, (Xr, Yr, Zr), (Xg, Yg, Zg) and (Zb,Yb,Zb) respectively. These three triplets can be combined to form a matrix, S.

$$S = \begin{bmatrix} Xr & Xg & Zb \\ Yr & Yg & Yb \\ Zr & Zg & Zb \end{bmatrix}$$

A relationship can now be formed between spectrometer output and duty factor.

$$\begin{bmatrix} X \\ Y \\ Z \end{bmatrix} = S \cdot \begin{bmatrix} D_r \\ D_g \\ D_b \end{bmatrix}$$

Alternatively, $$\begin{bmatrix} D_r \\ D_g \\ D_b \end{bmatrix} = \overline{S} \cdot \begin{bmatrix} X \\ Y \\ Z \end{bmatrix}$$

Thus, a duty factor triplet can be generated for a given color requirement (the color requirement must correspond to the same color scheme as the spectrometer). Ideally, the spectrometer and the (R, G, B) triplet input to color register 124 correspond to the same standard color scheme. In such a case, any (R, G, B) triplet will have a corresponding duty factor estimate, generated by the equation above. In the non-ideal case where the spectrometer and color register 124 correspond to different color schemes, a translation procedure is required to transform one color scheme to the other.

The relationship between (X, Y, Z) and ($D_r$, $D_g$, $D_b$) given by the S matrix becomes less accurate over the lifetime of the light source 10. The relationship also varies with operating conditions. However, the function of the relationship is to generate a duty factor estimate that is only a close, reasonable approximation of the final duty factor. The variation caused by aging and operating conditions has insignificant impact to that function. If required, however, the S matrix can be updated periodically throughout the lifetime of the light source.

Figure 3:
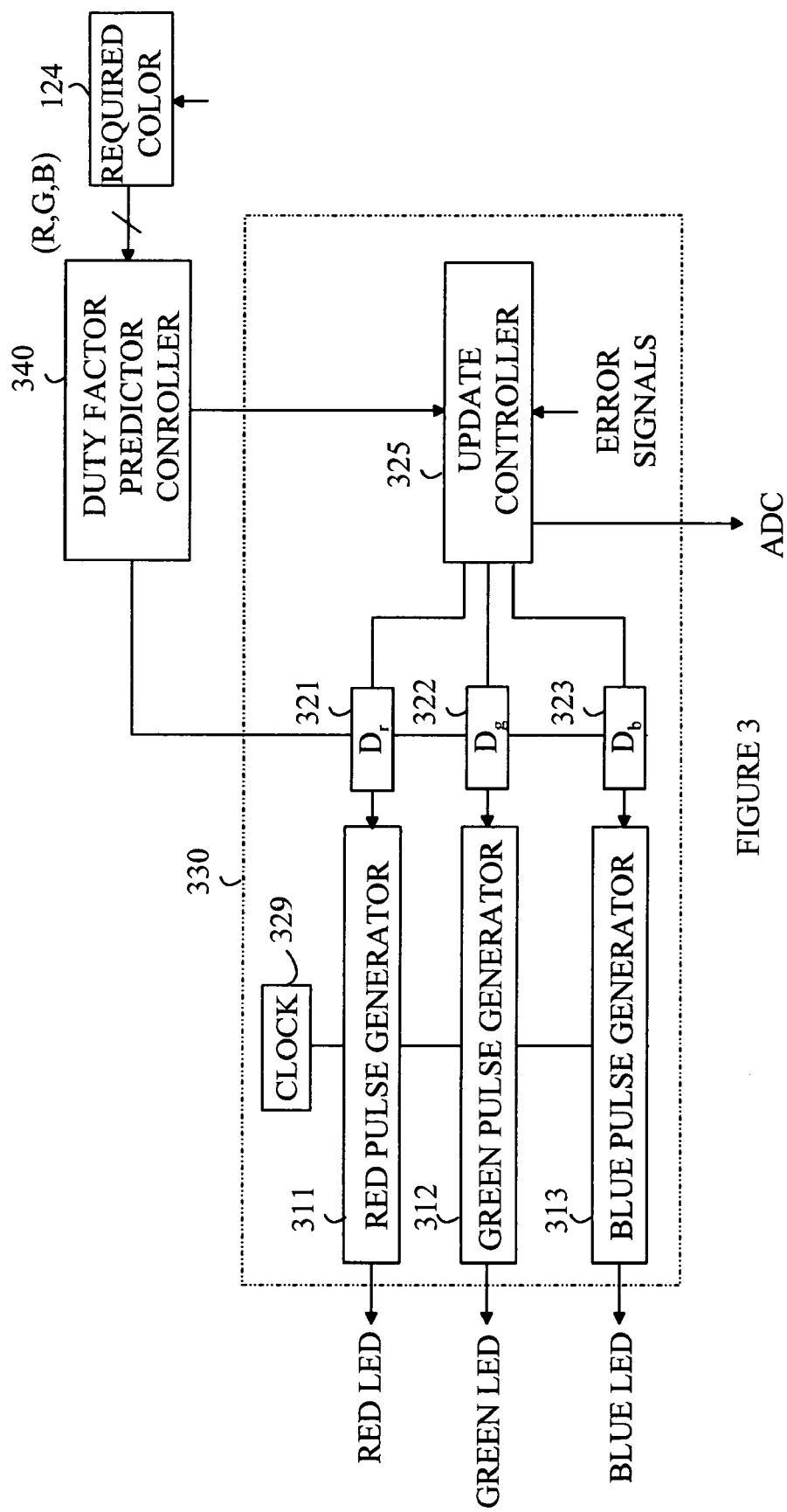
FIG. 3 is a more detailed block diagram of a feedback controller and a duty factor predictor.

The manner in which a light source according to one embodiment of the present invention operates can be more easily understood with reference to FIG. 3, which is a more detailed block diagram of a feedback controller 330 and a duty factor predictor 340. The pulse trains that drive the LEDs are generated by the red, green, and blue pulse generators shown at 311–313. Each pulse train generator has a corresponding duty factor register that contains a digital value representing the duty factor to be utilized by that pulse train generator. The duty factor registers corresponding to pulse generators 311–313 are shown at 321–323, respectively. The pulse train generators utilize a clock 329 to define the pulse period T shown in FIG. 1. In the embodiment shown in FIG. 3, at the beginning of each pulse period, the duty factor value is input to a countdown register in the pulse generator and the output of the pulse generator is set to a first value. On each clock pulse, the countdown register is decremented. When the count in that register reaches 0, the output of the pulse generator is set to a second value.

Update controller 325 periodically causes the ADC shown in FIG. 2 to cycle through the outputs of the low pass filters and read the error signals generated when each of the digitized low pass filter outputs is compared to the corresponding RGB value from register stack 124 shown in FIG. 2. The error signals are then used to compute updates that are entered into duty factor registers 321–323. The update period used by update controller 325 is preferably synchronized with the pulse periods used by the pulse generators. To simplify the drawing, the connections between clock 329 and the registers that define the pulse period have been omitted from the drawing.

In this embodiment, duty factor predictor 340 is connected to duty factor registers 321–323 and to register stack 124. When the contents of register 124 change, duty factor 340 computes the duty factor estimates corresponding to the new values in register stack 124 and causes these values to be loaded into duty factor registers 321–323. Duty factor controller 340 then sends a signal to update controller 325 that causes update controller 325 to cease updating the contents of duty factor registers 321–323. For example, this control function can be implemented by inserting a series of gates between the duty factor register inputs and update controller 325, the gates being controlled by duty factor controller 340. After the error signals have stabilized, duty factor predictor 340 causes update controller 325 to return to the mode in which it provides periodic updates to duty factor registers 321–323.

As noted above, duty factor predictor 340 prevents update controller 325 from updating duty factor registers 321–323 for some period of time after new values are received by register stack 124. The length of this period can be set by any of a number of criteria. The simplest method is to wait a fixed period of time that is sufficient to guarantee that the error signal values have had time to establish new values reflecting the duty factors entered into duty factor registers 321–323 by duty factor predictor 340. Since the RC time constants of the low pass filters are known, the time needed for the error signals to stabilize sufficiently in the worst case can be determined. However, if changes in the contents of duty factor registers 321–323 are significantly less than this worst case, the first phase of the color change protocol will be longer than needed.

Alternatively, duty factor predictor 340 can examine the error signals directly to determine when the error signals have stabilized sufficiently to allow update controller 325 to resume its normal operation. Such an embodiment assumes that during the first phase of the update procedure, update controller 325 continues to operate in a manner that provides for the generation and reading of the error signals.

Figure 4:
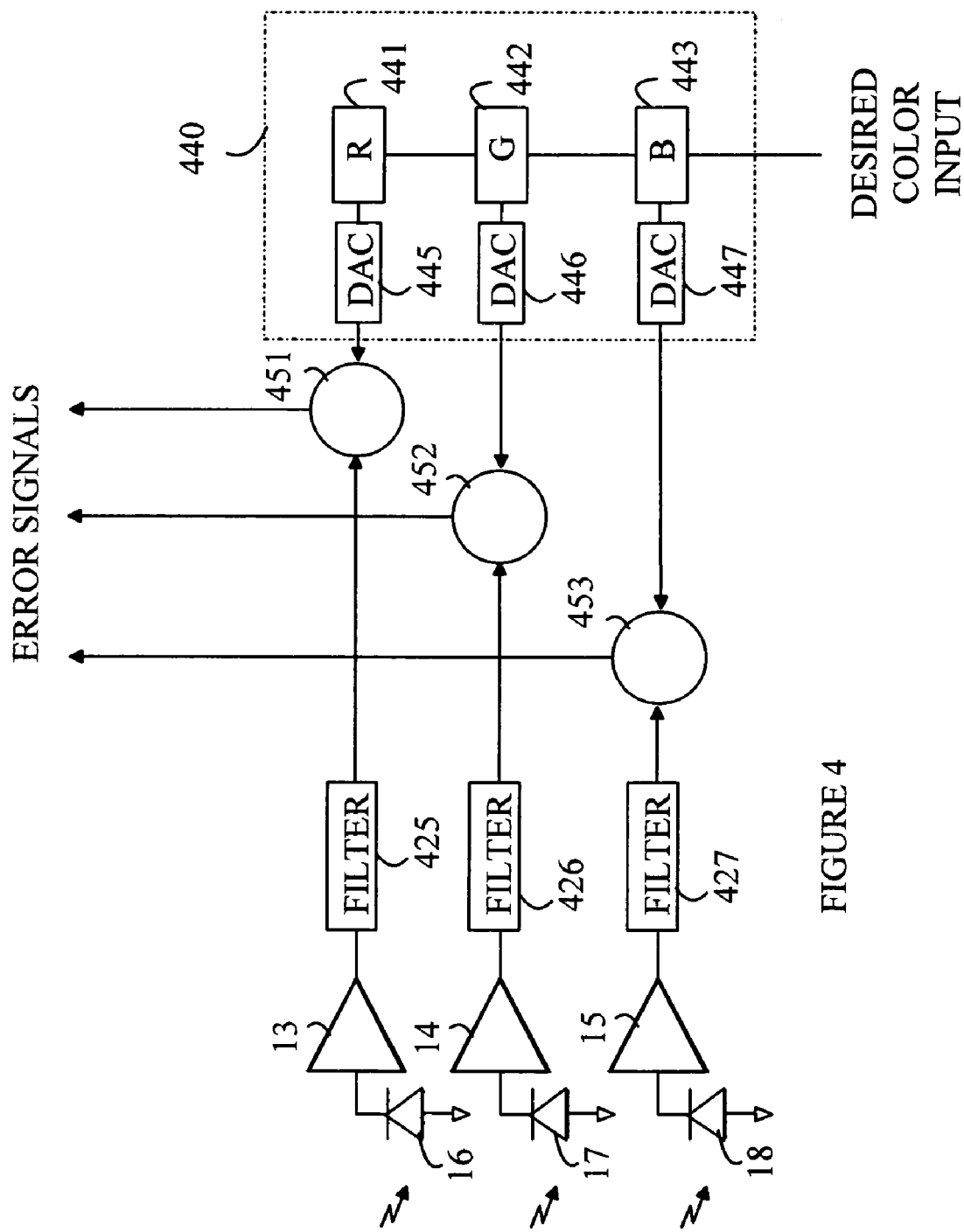
FIG. 4 is a block diagram of a circuit for generating analog error signals for adjusting the duty factors.

The above-described embodiments of the present invention utilize a digitally based error-signal generation scheme. Embodiments in which the error signals used by the update controller are analog can also be constructed. Refer now to FIG. 4, which is a block diagram of a circuit for generating analog error signals to adjust the duty factors. In this embodiment, the outputs of low pass filters 425–427 are compared with corresponding analog target signals generated by DACs 445–447 in the target register stack 440. There is one such DAC corresponding to each register in the stack. The registers corresponding to DACs 445–447 are shown at 441–443, respectively. The low pass filter outputs and the analog target signals are compared in subtraction circuits 451–453. The resulting three error signals are then sent to the feedback controller.

The above-described embodiments of the duty factor predictor utilize a particular functional relationship between the target RGB values and the duty factors. Alternatively, a lookup table can be used to map the relationship between the target RGB values and the duty factors.

It should be noted that the present invention can accommodate relatively long feedback loop update time periods. When the target color changes, the present invention immediately switches to a color that is close to the final color specified. When the feedback loop is released to fine tune the duty factors, the difference between the predicted values and the final values is relatively small, and hence, very few updates will be needed to arrive at the final value.

The above-described embodiments of the present invention utilize 3 LEDs as the light generator. However, embodiments of the present invention that utilize different numbers of LEDs can also be constructed. As long as there is a specific relationship between LED light output and photodetector output, any number of LEDs can be used. The minimum number of LEDs is one.

In addition, the present invention is not limited to LEDs as the light generators. Any light generator that provides an output spectrum that can be separately monitored can be used. For example, the LEDs discussed above could be replaced by lasers.

The above-described embodiments of the present invention utilize an intensity control scheme in which the duty cycle of the LEDs is varied to vary the intensity of light generated by the light source. However, the present invention could also be applied to light sources in which the intensity of light generated by each LED is altered to alter the intensity of the light source. In such an embodiment, the duty factor predictor discussed above would be replaced by a circuit that sets the initial intensity values when the target color values are changed. Such an embodiment would settle to the new intensity values more quickly than an embodiment that did not utilize the initial values that depend on the new target value when the target value is changed.

Various modifications to the present invention will become apparent to those skilled in the art from the foregoing description and accompanying drawings. Accordingly, the present invention is to be limited solely by the scope of the following claims.

What is claimed is:

1. A light source comprising:
   a light generator that generates a first light signal of a first wavelength at a first intensity that is set by a first control signal;
   a light monitor that generates a first monitor signal having an amplitude determined by said first intensity;
   a target signal generator that generates a first target signal having an amplitude indicative of a first target value;
   a difference circuit that generates a first error signal having a magnitude related to the difference of said amplitudes of said first monitor signal and said first target signal;
   a feedback controller that generates said first control signal in response to said first error signal; and
   an initial control signal generator that causes said feedback controller to generate a preliminary first control signal in place of said first control signal, said preliminary control signal being independent of said first error signal and being generated for a first time period after said first target value changes to a new first target value, wherein
   said light generator generates a second light signal of a second wavelength at a second intensity that is set by a second control signal,
   said light monitor generates a second monitor signal having an amplitude determined by said second intensity,
   said target signal generator generates a second target signal having an amplitude indicative of a second target value,
   said difference circuit generates a second error signal having a magnitude related to the difference of said amplitudes of said second monitor signal and said second target signal
   said feedback controller generates said second control signal in response to said second error signal; and
   said initial control signal generator causes said feedback controller to generate a preliminary second control signal in place of said second control signal, said preliminary control signal being independent of said first and second error signals and being generated for a second time period after either said first target value or said second target value changes, and
   wherein said light generator generates a third light signal of a third wavelength at a third intensity that is set by a third control signal,
   said light monitor generates a third monitor signal having an amplitude determined by said third intensity,
   said target signal generator generates a third target signal having an amplitude indicative of a third target value,
   said difference circuit generates a third error signal having a magnitude related to the difference of said amplitudes of said third monitor signal and said third target signal;
   said feedback controller generates said third control signal in response to said third error signal; and
   said initial control signal generator causes said feedback controller to generate a preliminary third control signal in place of said third control signal, said preliminary control signal being independent of said first and third error signals and being generated for a third time period after either said first target value or said third target value changes.

2. A method for controlling a light source that generates a light signal of a wavelength at an intensity that is set by a control signal, said method comprising:
   forming an error signal from a monitor signal having an amplitude determined by said intensity and a target signal having an amplitude indicative of a target value, said error signal having a magnitude related to the difference of said amplitudes of said monitor signal and said target signal:
   generating said control signal in response to said error signal and generating a preliminary control signal in place of said control signal, said preliminary control signal being independent of said error signal and being generated for a time period after said target value changes to a new target value,
   wherein forming said error signal comprises filtering said monitor signal through a low pass filter.

3. The method of claim 2 wherein said time period depends on a time constant associated with said low pass filter.

* * * * *

UNITED STATES PATENT AND TRADEMARK OFFICE
CERTIFICATE OF CORRECTION

PATENT NO. : 7,030,574 B2 Page 1 of 1
APPLICATION NO. : 11/106910
DATED : April 18, 2006
INVENTOR(S) : Li Lim It is certified that error appears in the above-identified patent and that said Letters Patent is hereby corrected as shown below:

Col. 8 Line 7(Approx.) In Claim 1, after "signal" insert -- ; --.

Col. 8 Line 46(Approx.) In Claim 2, delete ":" and insert -- ; --, therefor.

Signed and Sealed this

Seventeenth Day of February, 2009

JOHN DOLL
*Acting Director of the United States Patent and Trademark Office*